UNITED STATES PATENT OFFICE.

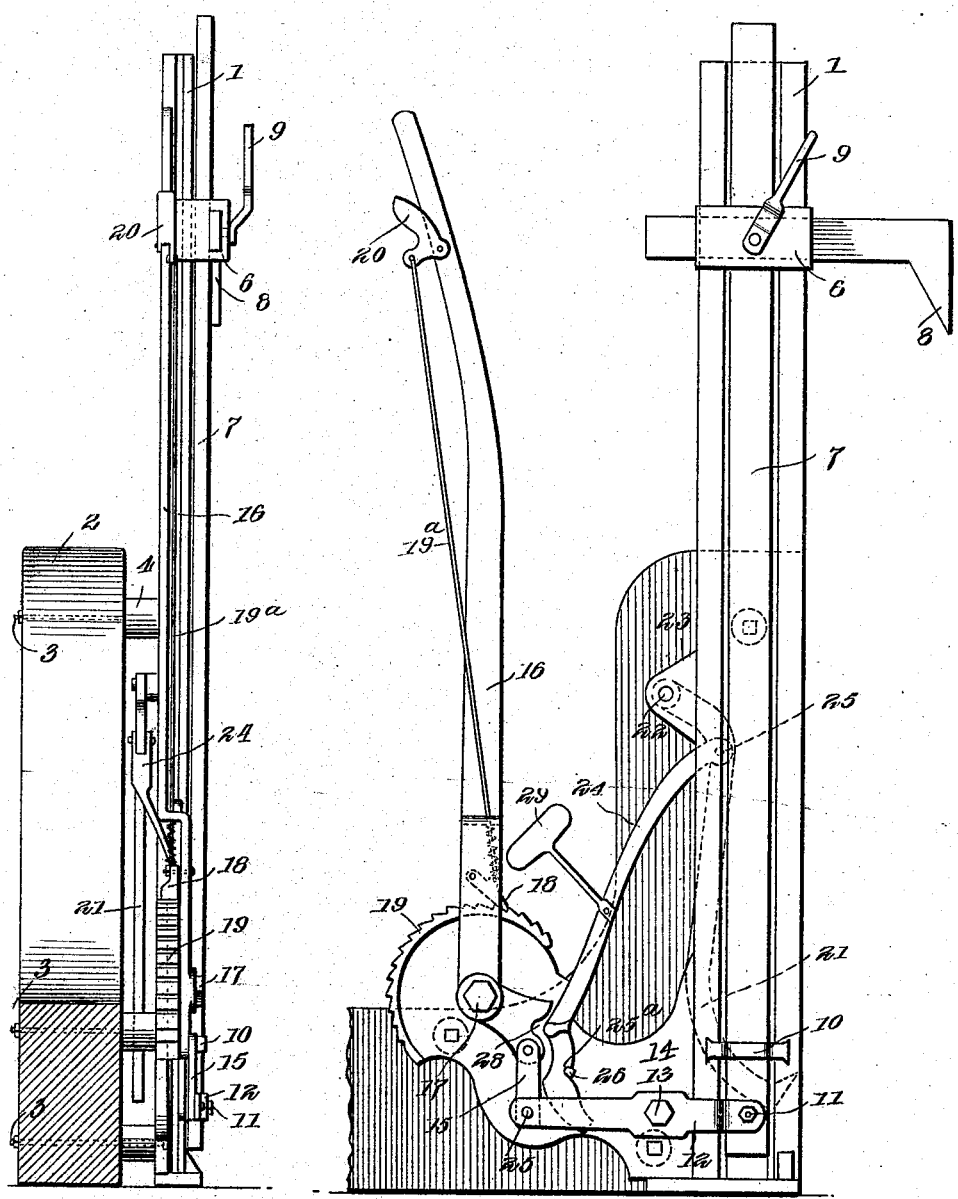

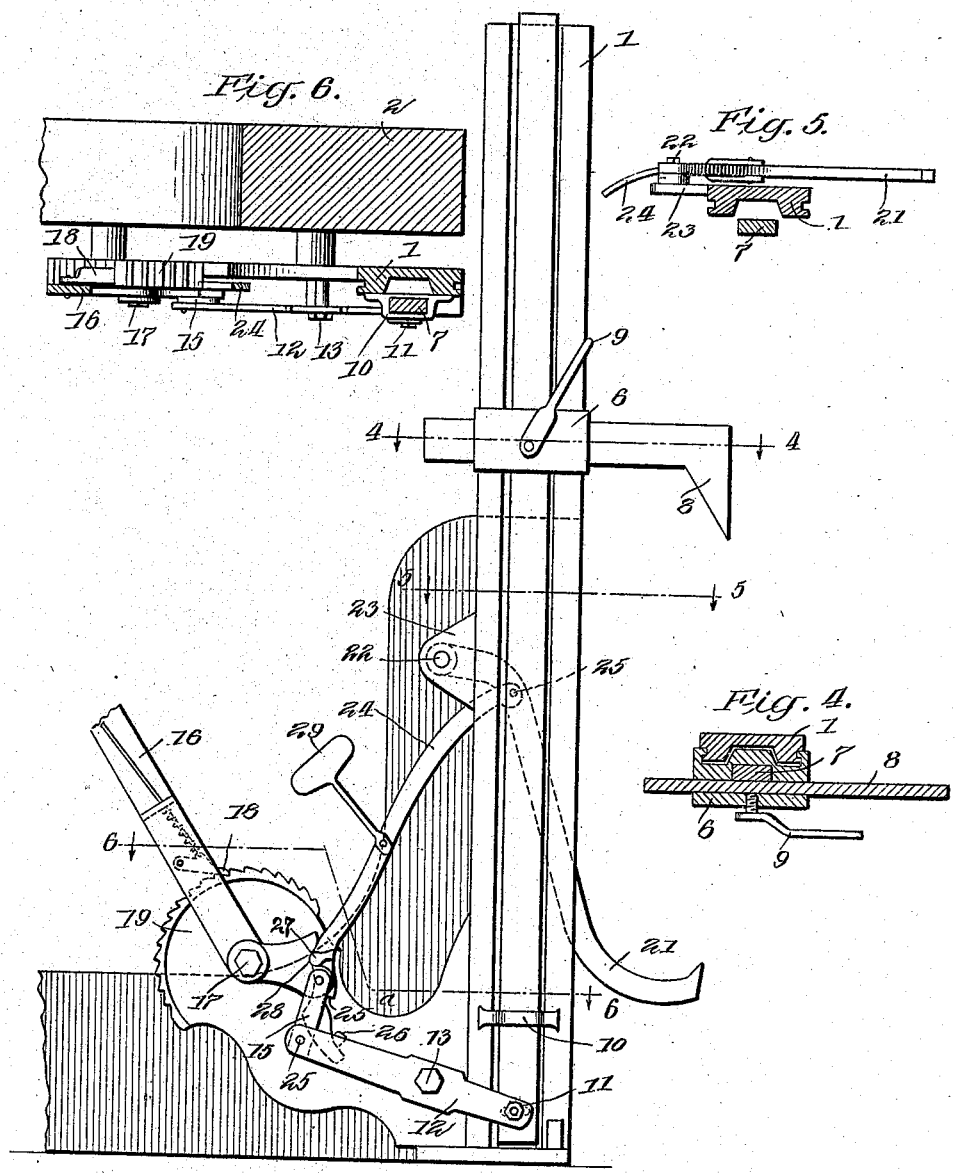

ALBERT V. WINEMAN, OF GREENVILLE, MISSISSIPPI.

SAWMILL-DOG.

No. 905,040.   Specification of Letters Patent.   Patented Nov. 24, 1908.

Application filed February 1, 1908. Serial No. 413,772.

*To all whom it may concern:*

Be it known that I, ALBERT V. WINEMAN, a citizen of the United States, and a resident of Greenville, in the county of Washington and State of Mississippi, have made certain new and useful Improvements in Sawmill-Dogs, of which the following is a specification.

My invention is an improvement in sawmill dogs and consists in certain novel constructions and combinations of parts hereinafter described and claimed.

Referring to the drawings forming a part hereof—Figure 1 is a side view of the improvement showing the dogs in one position. Fig. 2 is a similar view showing the dogs in another position. Fig. 3 is a rear view. Fig. 4 is a section on the line 4—4 of Fig. 2. Fig. 5 is a section on the line 5—5 of Fig. 2, and Fig. 6 is a section on the line 6—6 of the same figure.

The present embodiment of my invention comprises a vertical plate 1, which is secured to the knee-block 2, by means of bolts 3, sleeves 4 being arranged on the bolts to space the plate from the knee-block.

The plate 1 is provided on its outer face with a guide-way 5, in which is slidably mounted a carriage 6, provided with a vertical opening through which moves a slide bar 7, and with a horizontal opening, through which moves the upper dog 8, the dog being locked to the carriage and the carriage to the sliding bar, by means of a handled set screw 9.

The lower end of the sliding bar is guided in its movement by a cross bar 10, and is provided with a slot, through which passes a bolt 11 connected with one end of a rocking lever 12, pivoted as at 13 to a lateral bracket 14 of the plate 1, and the other end of the rocking lever is connected by a link 15 with one end of a lever 16, pivoted as at 17 to the bracket, and provided with a spring actuated tooth 18, adapted to engage a toothed quadrant 19, the said tooth being connected by a wire 19ª with a grip 20 of usual construction on the said lever. It will be obvious from the description, that by releasing the tooth and swinging the lever 16, the sliding bar 7 may be raised or lowered to bring the upper dog 8 towards or from the log on the mill carriage, after the said dog is locked to the bar by the handled set screw 9. In placing the dog, the set screw 9 is turned to release the dog from the carriage and the carriage from the sliding bar, after which the said dog is adjusted horizontally to properly engage the log. The carriage is now moved downward until the dog is in contact with the log, after which the lever 16 is operated to move the sliding bar downward, whereby to force the dog into the log.

The lower dog 21 has one of its ends pivoted as at 22 to a bracket 23 extending from the plate 1, and a link 24 is pivoted as at 25 to the said dog near the connected end thereof. The link 24 is bent laterally as shown in Fig. 3, so that the lower end thereof is on the opposite side of the bracket 14 from the upper end, and the said lower end is provided with a notch 25ª for engaging a pin 26, whereby to limit the backward movement of the dog. The said lower end is also provided with a lug 27, which may be engaged with a notch 28 on the lower end of the lever 16, whereby to swing the dog into contact with the log as shown in Fig. 2. A handle 29 is provided for manipulating the link to engage the lug with the notch.

In the operation of the complete device, the upper dog is moved into contact with the log as before described, after which the lug 27 is engaged with the notch 28. On now swinging the lever 16, the sliding bar is moved downward to force the upper dog into the log, and the lower dog is swung as shown in Fig. 2, to force said lower dog also into the log.

I claim—

1. In a device of the class described, a vertical plate provided at its lower end with a bracket, a bar slidable in the plate, an upper dog adjustably connected with the bar, a rocking lever pivoted on the bracket and having one end connected with the bar, a lever pivoted to the bracket, a link connecting one end of said lever with the other end of the rocking lever, means for locking the lever in its adjusted position, a lower dog having one end pivoted to the plate, a link connected with said lower dog and provided with a lug, said lever having a notch for engagement by the lug whereby to operate the dog, and a handle on the link for moving the same to engage the lug with the notch.

2. In a device of the class described, a plate provided at its lower end with a bracket, a bar slidable in the plate, an upper dog adjustably connected with the bar, a lever pivoted to the bracket and operatively connected with the lower end of the bar for moving the same, means for locking the lever in its adjusted position, a lower dog mounted for swinging movement toward and from the other dog and normally disconnected with the lever, and means for operatively connecting the lower dog with the lever whereby to swing said dog.

3. In a device of the class described, a vertically movable bar, a carriage slidable on the bar, an upper dog movable horizontally in the carriage, means for locking the dog to the carriage and the carriage to the bar, a pivotally mounted lever operatively connected with the bar for moving the same, a lower dog mounted for swinging movement toward and from the upper dog and normally disconnected with the lever, and means for operatively connecting the lower dog with the lever whereby to operate said dog.

4. In a device of the class described, a vertically movable bar, an upper dog adjustable transversely and longitudinally of the bar, means for locking the dog to the bar, a lower dog mounted for swinging movement toward and from the upper dog normally disconnected with the lever, means for moving said bar, and means for operatively connecting said moving means with the lower dog.

ALBERT V. WINEMAN.

Witnesses:
JAMES W. BERMINGHAM,
WILLIAM H. PARKER.